Patented May 23, 1933

1,910,464

UNITED STATES PATENT OFFICE

ARNOLD DOSER, OF COLOGNE-MULHEIM-ON-THE-RHINE, AND GUSTAV MAUTHE, OF COLOGNE-HOLWEIDE-ON-THE-RHINE, GERMANY, ASSIGNORS, BY MESNE ASSIGNMENTS, TO GENERAL ANILINE WORKS, INC., OF NEW YORK, N. Y.

TANNING AGENT AND PROCESS OF MAKING SAME

No Drawing. Application filed February 11, 1930, Serial No. 427,646, and in Germany February 21, 1929.

The present invention relates to new tanning agents and to a process for their manufacture.

The new process consists in condensing a polyhydroxybenzene of the general formula:

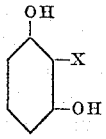

wherein X stands for OH or H with an aldehyde of the general formula:

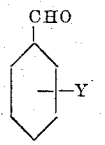

wherein Y stands for H, OH or halogen at a temperature between about 0° C. and the boiling point of the reaction mixture; the reaction is interrupted when little or no hydroxybenzene is still present.

Best results are obtained when the compounds are brought to reaction in about the proportions of 3 mols of polyhydroxybenzene upon 1–1.5 mols of aldehyde but it is evident that other proportions do not influence the reaction; it is necessary, however, to remove the excess of the one component. The reaction is accelerated by adding a compound having an acid reaction to the reaction mixture, a catalytically small quantity of about 0.1–1% of acid being sufficient, the kind of the acid reacting compound being immaterial; we prefer to use hydrochloric acid.

The substituted benzaldehydes behave in substantially the same manner in this reaction as benzaldehyde. In the former case, however, substantial quantities of crystalline, sparingly soluble triphenyl methane derivatives are formed, whereas in the case of using benzaldehyde as starting material condensation products which show hardly any tendency to crystallization are obtained.

The velocity of reaction is strongly influenced by modifying the concentration, the temperature and the nature and quantity of the acid added, with the result that according to the reaction conditions the condensation may be completed within less than one hour up to several days.

The stage of the condensation at any time can be seen, for example, from the color reaction which occurs by the addition of a ferric chloride solution to a very dilute test portion of the condensation mixture. (Aldehydes, which by themselves give a color reaction with this reagent, such as, for example, salicyl aldehyde are advantageously removed previously from the test portions.) Thus, for example, reaction mixtures of resorcinol first show the violet coloration characteristic of this substance. At the rate at which the condensation proceeds the violet coloration changes to blue, which then (more or less quickly) becomes grey, olive and cloudy and finally a dirty yellow. Shortly after the resorcinol reaction no longer occurs by the addition of ferric chloride, insoluble products separate from the mixture on dilution with cold water.

By means of this color reaction it is easy to recognize the desired stage of condensation; the reaction can be stopped at this point by neutralization of the added acid. This is of importance inasmuch as, according to the degree of condensation, the reaction masses obtained possess quite different tanning properties. When the mixture is worked up at a stage at which the color reaction still shows the presence of small quantities of the hydroxybenzene, tanning agents are obtained, which yield an extraordinarily plump and at the same time very soft, pliable leather; when, however the condensation is allowed to proceed until the color reaction of the hydroxybenzene no longer appears the tanned products display besides great plumpness a considerably greater resisting power and reduced softness.

The working up can be carried out in various ways. In general, it suffices to neutralize the solution, to remove any aldehyde that may still remain and to evaporate the solution to the suitable concentration, advantageously under reduced pressure. When using substituted aldehydes the constituents which crystallize out in the course of the reaction are advantageously removed before evaporation. Thus, tanning agents are obtained in the form of brown colored, clear syrups, which after a few days fade somewhat and sometimes also separate crystals; but even then they dissolve to a clear solution on dilution with hot water and the solution thus obtained remains clear for a prolonged time. Strong acids, as well as salt solutions precipitate the tanning agents partially from the aqueous solution.

In all cases these syrups consist of concentrated solutions of a mixture of condensed products of varying degrees of condensation, the readily soluble amorphous constituents of which possess the property of strongly retarding the crystallization of the sparingly soluble triphenyl methane derivatives and the like, which may have been produced; even in dilute aqueous solutions these readily soluble constituents are capable of maintaining in solution the sparingly soluble pure products for a prolonged time, sufficient for practical purposes.

As regards the tanning the following advantageous properties should be mentioned: In contradistinction to many synthetic tanning agents, the solutions of these new compounds show a nearly neutral reaction so that any damage of the skin to be tanned is avoided; the ratio of tanning to non-tanning substance is a very favorable one, for example, 12:1; the graining and plumpness of the finished leather are excellent. The new tanning substances are, therefore, particularly suitable for increasing the tanning action and improving the properties of other synthetic and vegetable tanning substances.

The following examples will illustrate our invention without limiting it thereto:

*Example 1.*—110 parts by weight of resorcinol, 40 parts by weight of benzaldehyde and 110 parts of water containing 1% of 20% hydrochloric acid are heated to 30° C. The temperature rises slowly to 40° C. After 4 hours a test portion is soluble in water and with ferric chloride gives a pure blue coloration, which fades quickly. After neutralizing and evaporating the mixture in vacuo to 160 parts by weight the syrup is stirred with concentrated bisulfite solution and filtered from the aldehyde bisulfite compound. On dissolving the syrup in ether, drying and evaporating the ether there is obtained a golden yellow mass, which is almost solid at room temperature and which dissolves in water to a clear solution, possessing weakly acid reaction. The content of tanning material is 63.5 parts, the content of non-tanning substance amounts to 2.4 parts.

*Example 2.*—100 parts by weight of resorcinol, 40 parts by weight of benzaldehyde and 110 parts of water are stirred together. One part by weight of 20% hydrochloric acid is added and the whole is left to stand at 20–25° C. After 28 hours the mixture is neutralized and, after removing traces of aldehyde still remaining by steam distillation, it is concentrated in vacuo to 160 parts by weight. A syrup is obtained, which dissolves in water at first to a clear solution, after some months to a somewhat cloudy one. The aqueous solution has a neutral reaction and gives a pure blue, temporary color by the addition of ferric chloride. By the addition of strong acids or sodium chloride, the condensation products are partially precipitated. A 56% product contains 50.8% of tanning material and 5.2% of non-tanning substance. Leather produced by means of this product is distinguished by great plumpness and satisfactory resistivity.

*Example 3.*—110 parts by weight of resorcinol, 45 parts by weight of salicyl aldehyde, 110 parts of water and 1 part by weight of 20% sulfuric acid are maintained at 20–24° C. for 26 hours. After neutralization the excess of aldehyde is expelled by steam and the clear solution is evaporated to 160 parts by weight. The resulting product is a reddish brown colored syrup, which after a few days separates a quantity of crystals, but nevertheless dissolves in cold water to a clear solution. The aqueous solution gives a pure blue ferric chloride coloration, which after some time becomes grey and finally brown. A 54% syrup or crystal magma consists of 49.8% of tanning agent and 3.68% of non-tanning substance.

*Example 4.*—110 parts by weight of resorcinol, 47 parts by weight of o-chlorobenzaldehyde, 110 parts of water and 0.5 parts by weight of 20% hydrochloric acid are stirred for 2 hours at 20–24° C. A thick crystal magma is formed. This is neutralized and after 16 hours filtered with strong suction. The residue after drying amounts to 57 parts by weight. The filtrate is concentrated in vacuo to 95 parts by weight. After a few days, sometimes only after some weeks, the syrup solidifies to a crystal magma, which is readily soluble in warm water and only after some days gradually becomes milky and cloudy. Ferric chloride reaction: reddish blue which soon becomes a milky, cloudy grey. A 42% crystal magma contains 33.7% of tanning agent and 8.3% of non-tanning substance. Analogous compounds are obtained when starting with bromo- or iodo-derivatives of aldehydes.

*Example 5.*—126 parts by weight of pyrogallol, 40 parts by weight of benzaldehyde, 126 parts of water and 1 part by weight of 20% hydrochloric acid are stirred together. After 20 hours neutralization is effected, any still remaining benzaldehyde is removed by means of steam, then the mixture is evaporated to 180 parts by weight. The resulting mobile syrup, which dissolves in water to a clear solution, solidifies after some time to a crystal magma, which is readily soluble in warm water and consists of 60% of tanning agent and 8.2% of non-tanning substance. The weakly alkaline solution gives with ferric chloride a pure blue precipitate.

We claim:

1. The new process which comprises reacting upon a polyhydroxybenzene of the general formula:

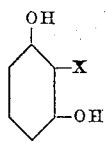

wherein X stands for H or OH, with an aldehyde of the general formula:

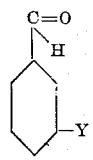

wherein Y stands for H, OH or a halogen, in an aqueous medium in the presence of a catalytically small amount of a compound having an acid reaction, and interrupting the reaction by neutralizing it as soon as free hydroxybenzene is no longer detectable.

2. The new process which comprises reacting upon 3 mols of polyhydroxybenzene of the general formula:

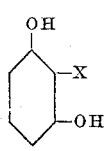

wherein X stands for H or OH, with 1 to 1.5 mols of an aldehyde of the general formula:

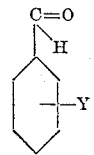

wherein Y stands for H, OH or a halogen, in an aqueous medium in the presence of a catalytically small amount of a compound having an acid reaction, and interrupting the reaction by neutralizing it as soon as free hydroxybenzene is no longer detectable.

3. The new process which comprises reacting upon a polyhydroxybenzene of the general formula:

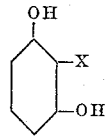

wherein X stands for H or OH, with an aldehyde of the general formula:

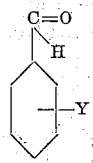

wherein Y stands for H, OH or a halogen, in an aqueous medium, at a temperature of between about 0° C. and the boiling point of the mixture, and in the presence of a catalytically small amount of a compound having an acid reaction, and interrupting the reaction by neutralizing it as soon as free hydroxybenzene is no longer detectable.

4. The new process which comprises reacting upon 3 mols of polyhydroxybenzene of the general formula:

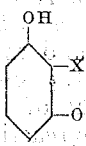

wherein X stands for H or OH, with 1 to 1.5 mols of an aldehyde of the general formula:

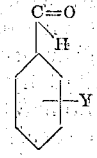

wherein Y stands for H, OH or a halogen, in an aqueous medium, at a temperature of between about 0° C. and the boiling point of the mixture, and in the presence of a catalytically small amount of a compound having an acid reaction, and interrupting the reaction by neutralizing it as soon as free hydroxybenzene is no longer detectable.

5. The new process which comprises reacting upon a polyhydroxybenzene of the general formula:

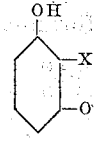

wherein X stands for H or OH, with an aldehyde of the general formula:

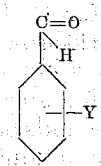

wherein Y stands for H, OH or a halogen, in an aqueous medium, at a temperature of between about 0° C. and the boiling point of the mixture, and in the presence of a catalytically small amount of hydrochloric acid, and interrupting the reaction by neutralizing it as soon as free hydroxybenzene is no longer detectable.

6. The new process which comprises reacting upon 3 mols of polyhydroxybenzene of the general formula:

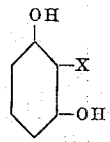

wherein X stands for H or OH, with 1 to 1.5 mols of an aldehyde of the general formula:

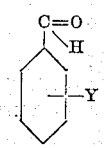

wherein Y stands for H, OH or a halogen, in an aqueous medium, at a temperature of between about 0° C. and the boiling point of the mixture, and in the presence of a catalytically small amount of hydrochloric acid, and interrupting the reaction by neutralizing it as soon as free hydroxybenzene is no longer detectable.

7. The new process which comprises reacting upon resorcinol with benzaldehyde in an aqueous medium, in the presence of a catalytically small amount of hydrochloric acid, at a temperature of about 30° to about 40° C., and neutralizing the reaction mixture as soon as free hydroxybenzene is no longer detectable.

8. The new water-soluble condensation products of a polyhydroxybenzene of the general formula:

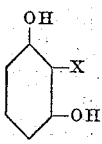

wherein X stands for H or OH, with an aldehyde of the general formula:

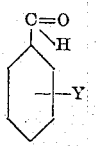

wherein Y stands for H, OH or a halogen, being yellow to dark-brown colored, giving with ferric chloride a bluish, quickly fading coloration, and having good tanning properties, these new compounds being substantially identical with those obtainable according to the process claimed in claim 1.

9. A new water-soluble condensation product of resorcinol and benzaldehyde, being golden-yellow colored and giving with ferric chloride a bluish, quickly fading coloration, this product being substantially identical with that obtainable according to the process claimed in claim 7.

In testimony whereof, we affix our signatures.

ARNOLD DOSER.
GUSTAV MAUTHE.